United States Patent [19]
Onogi et al.

[11] Patent Number: 5,878,365
[45] Date of Patent: Mar. 2, 1999

[54] BRAKE CONDITION DETECTOR AND VEHICLE CONTROLLER USING THE SAME

[75] Inventors: Nobuyoshi Onogi, Nagoya; Yuzo Imoto, Chita-gun; Masahiko Kamiya, Anjo; Masuhiro Kondo, Obu, all of Japan

[73] Assignee: Nippondenso Co., Ltd., Kariya, Japan

[21] Appl. No.: 657,188

[22] Filed: Jun. 3, 1996

[30] Foreign Application Priority Data

Jun. 5, 1995 [JP] Japan ................................. 7-138068

[51] Int. Cl.⁶ .................. B60T 17/00; B60T 8/00
[52] U.S. Cl. .................. 701/70; 303/191; 303/146; 73/146; 701/80
[58] Field of Search .................. 701/29, 70, 73, 701/80; 303/150, 149, 191, 194, 195, 146; 73/146

[56] References Cited

U.S. PATENT DOCUMENTS

| | | | |
|---|---|---|---|
| 4,651,290 | 3/1987 | Masaki et al. | 364/550 |
| 5,108,159 | 4/1992 | Tsang et al. | 303/100 |
| 5,588,721 | 12/1996 | Asano et al. | 303/163 |
| 5,596,141 | 1/1997 | Nishikawa et al. | 73/146.2 |
| 5,662,393 | 9/1997 | Kamiya et al. | 303/194 |

FOREIGN PATENT DOCUMENTS

| | | |
|---|---|---|
| 2-34456 | 2/1990 | Japan . |
| 3-7648 | 1/1991 | Japan . |
| 6-27679 | 4/1994 | Japan . |
| 7-186927 | 7/1995 | Japan . |
| 7-246925 | 9/1995 | Japan . |

*Primary Examiner*—Michael Zanelli
*Attorney, Agent, or Firm*—Pillsbury Madison Sutro LLP

[57] ABSTRACT

Vibration observed in a tire wheel portion exhibits a resonant vibration phenomenon in which vibration fluctuates between a wheel and a surface of a tire. This phenomenon shows different characteristics depending upon how the surface of the tire is in contact with a road surface. Here, a detector derives a parameter corresponding to a gradient of a coefficient of friction based on these characteristics and detects a brake condition. Also, a controller executes ABS control based on such parameter.

38 Claims, 12 Drawing Sheets

FIXED END

FREE END

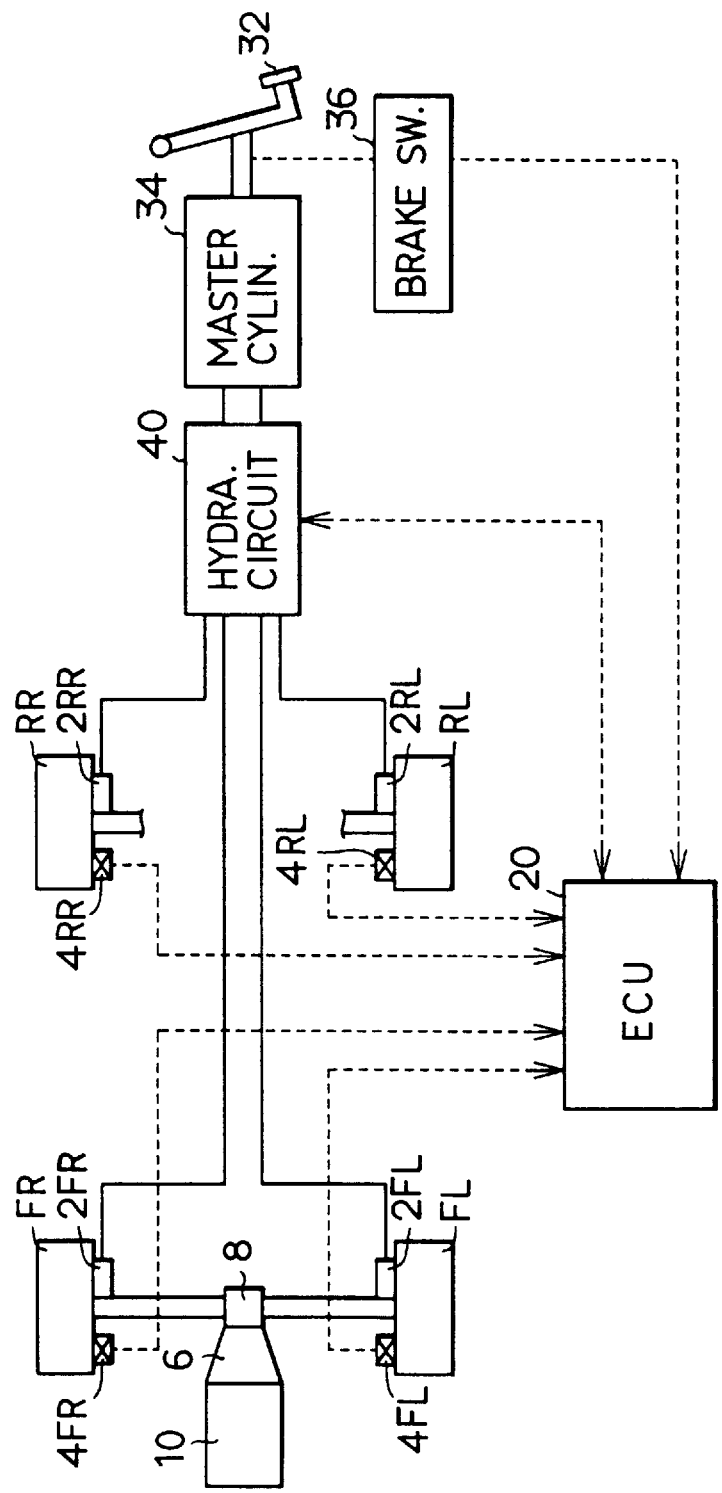

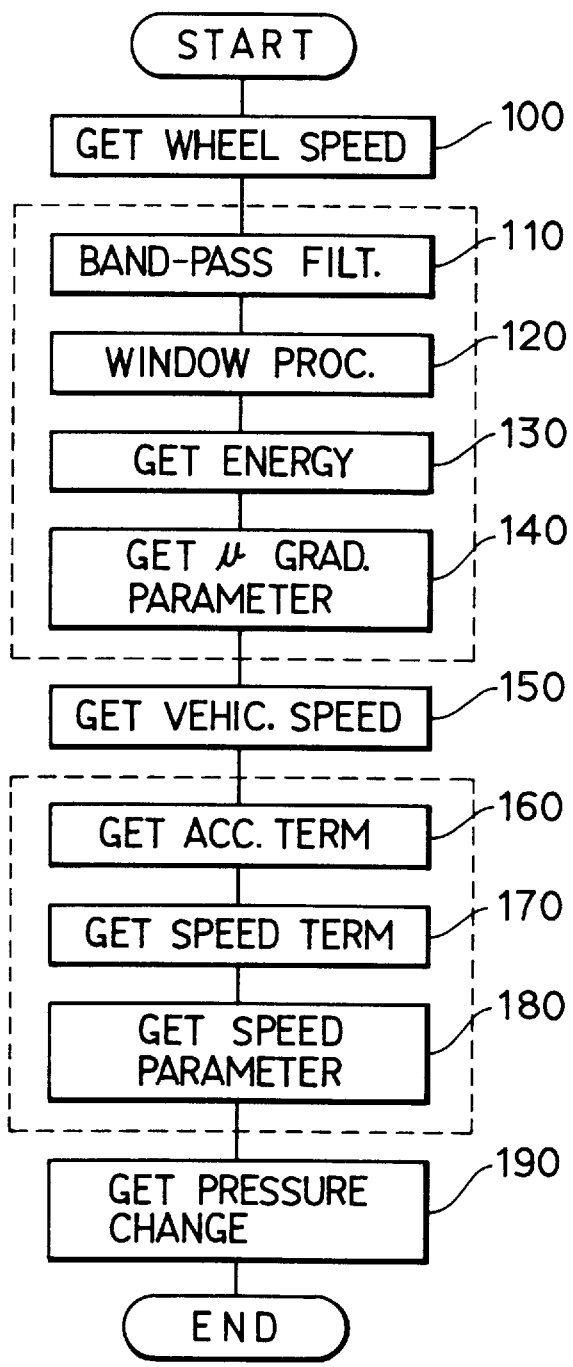

BRAKE CONDITION DETECTOR AND VEHICLE CONTROLLER USING THE SAME

CROSS-REFERENCE TO RELATED APPLICATION

This application is related to and claims priority from Japanese Patent Application No. Hei-7-138068, the contents of which are hereby incorporated by reference.

BACKGROUND OF THE INVENTION

1. Field of the Invention

The present invention relates to a brake condition detector for detecting a brake condition of a vehicle and a vehicle controller for performing vehicle control such as anti-skid control based upon a brake condition detected by the brake condition detector.

2. Description of Related Art

Conventionally, a vehicle brake system includes, for example, a master cylinder coupled to a brake pedal, a wheel cylinder provided to a brake mechanism of the vehicle and a reservoir for storing brake fluid, all of which are connected via fluid lines.

In this brake system, an anti-skid controller is provided with an inflow valve, for example, in a fluid line between the master cylinder and the wheel cylinder and an outflow valve in a fluid line between the wheel cylinder and the reservoir. These valves are switched and controlled to increase or reduce the pressure of brake oil in the wheel cylinder.

During the execution of anti-skid control by such a controller, brake force is intensified by gradually increasing pressure of brake oil by a certain amount $\Delta P$ as shown in FIG. 17A through the operation of a pump and a solenoid valve in an oil hydraulic circuit with the brake oil being supplied from the master cylinder and the reservoir to the wheel cylinder. Brake condition is determined after detecting an amount of reduction in the vehicle wheel speed in response to the increased pressure based on the wheel speed and its acceleration component which represents its derivative.

That is, as shown in FIG. 17B, when a slip rate of a vehicle wheel over a road surface in an area in which such slip rate is smaller than a point at which a gradient of a coefficient of friction $\mu$, which denotes the adhesion between the vehicle wheel and the road surface, greatly varies, i.e., the $\mu$ gradient turning point, the amount of reduction in the wheel speed in response to the increased pressure is small because of increased road surface brake force due to increase in the slip rate. However, when a slip rate is in an area in which it is larger than the above-described turning point, balance between the road surface brake force and brake force is upset even by a slightly intensified pressure and thus, wheel speed is reduced to a point in which the wheels tend to lock.

In other words, it is not until a wheel speed is reduced that a brake condition can be judged.

As a result, as shown in FIGS. 17C and 17D, for conventional anti-skid control, temporal characteristics of the wheel rotating speed and the hydraulic pressure (wheel pressure) would form an irregular wavy shape.

A system which detects a point where the gradient of a coefficient of friction $\mu$ greatly varies based on the decrease of the wheel speed poses the following problems.

First, when the hydraulic pressure is gradually intensified and wheel rotating speed is reduced, pressure may need to be reduced and thus, a fixed brake condition cannot be kept.

That is, there is a need to repeatedly execute the processes of increasing pressure, detecting vehicle speed drop and decreasing pressure to constantly cope with the ever-changing road surface condition, and so, the above system poses problems related to brake distance and passenger comfort.

One other problem is that when the vehicle moves to a road having a different $\mu$ gradient coefficient which represents the maximum $\mu$, for example, when road surface conditions changes and a coefficient of friction $\mu$ of the road surface increases rapidly, the time period in which pressure is gradually intensified until a wheel rotating speed is reduced will be prolonged and thus, delays in the determination of the above-described turning point will affect the brake distance.

SUMMARY OF THE INVENTION

In view of the foregoing problems of the prior art in mind, the present invention aims to provide a brake condition detector which can detect a brake condition without reducing wheel speed and a vehicle controller which does not depend on comparisons of maximum road surface coefficients of friction of different road surfaces and which has enhanced adaptability to varying road surface coefficients of friction.

The basic principle of the present invention will be described hereinafter.

Vibration applied to a tire results in a fluctuation phenomenon (which is also referred to as sloshing hereinafter and in the claims) in which vibrational energy fluctuates between the inertia of a tire wheel (in an axle shaft side) and inertia on the surface of the tire (tire tread surface).

The phenomenon in which a resonant vibration accompanied by a time lag in the rotational direction of a tire fluctuates between the above-described wheel and the surface of the tire is called a fluctuation phenomenon of the resonant vibration of the tire as shown in FIGS. 2A–2D.

In this fluctuation phenomenon, vibration of the surface of the tire varies depending on whether the surface of the tire touches the surface of a road or not. That is, as shown in FIG. 2A, if vibration on the surface of a tire is suppressed due to the contact of the surface of the tire with that of the road, the contact location functions as a fixed end and vibrations are reflected at this fixed end. As a result, a combined waveform of the vibrational waveform P1 of the wheel and the waveform P2 of vibration reflected at the fixed end is detected by a vibrational sensor GS provided to a wheel and a vibrational sensor Gt provided on the surface of a tire.

That is, the state in which the surface of a tire functions as a fixed end when the tire surface is in contact with the road surface and vibration is suppressed corresponds to a region in which the gradient of a coefficient of friction $\mu$ is steep such as that shown in FIG. 3 which shows the relationship between a coefficient of friction $\mu$ and a slip ratio s.

It must be noted here that as a component for producing a reaction force which suppresses the change in the speed of the tire surface, the ratio of increase of a coefficient of friction between the surface of the tire and that of a road with respect to a change in the slip rate, or a value obtained by differentiating the reaction force of the road surface caused by a relative velocity of the tire surface with that of the road by the relative velocity is referred to as the gradient of coefficient of friction $\mu$.

Meanwhile, as shown in FIG. 2B, if the surface of a tire is not in contact with that of the road, there will be no reflection as in the case with one fixed end. As a result, the waveform detected by the vibrational sensor GS provided to the wheel and the vibrational sensor Gt provided to the surface of a tire is formed by only by the vibrational waveform P1 as shown in FIG. 2B. (P2 is limited to a small value.)

By lifting the tire so that it is not in contact with the road, the condition in which vibration in the rotational direction is not fixed corresponds to an area in which the gradient of a coefficient of friction $\mu$ is zero and in which vibration on the surface of the tire cannot be suppressed. That is, as shown in FIG. 3, if the slip rate increases and passes through a point where the gradient of a coefficient of friction $\mu$ varies greatly, the gradient of the coefficient of friction $\mu$ in relation to the slip rate s will be small and will have characteristics close to that of an open end.

Generally, the characteristics of the coefficient of friction $\mu$ show tendencies for the $\mu$ gradient to be large when the slip rate is small and, while varying from road to road, the $\mu$ gradient tends to decrease after a predetermined slip rate. In the present invention, the point in which the $\mu$ gradient greatly varies with respect to the slip rate is called a $\mu$ gradient turning point. As shown in FIG. 3, generally, an area in which the $\mu$ gradient is small is an area in which road surface brake force is strong and at a maximum.

From the above, it is clear that the $\mu$ gradient shows whether or not the tire surface is in contact with that of the road and that the $\mu$ gradient has an effect on the fluctuation of the tire resonance vibration. Therefore, a brake condition can be detected accurately such as the brake force approaching the maximum brake force when the gradient is small and that the brake force is before a point where the $\mu$ gradient varies greatly when the gradient is large by estimating the $\mu$ gradient based upon the fluctuation of the tire resonance vibration.

In the present invention, a unit, which determines a brake condition by determining if the brake force is close to the maximum brake force, in other words, determining if control is being executed past the $\mu$ gradient turning point where the $\mu$ gradient is small, may be adopted.

Next, the effects of the invention will be described.

One aspect of the present invention provides a brake condition detector that includes a fluctuation detection unit for detecting fluctuation of resonance vibration in a tire of a wheel of a vehicle and a brake condition detection unit for detecting a brake condition of the wheel based upon the fluctuation of resonance vibration detected by the fluctuation detection unit.

In this way, the fluctuation of resonance vibration in a tire of a wheel of a vehicle is detected by a fluctuation detection unit and a brake condition of the wheel is detected by a brake condition detection unit based upon the fluctuation of resonance vibration with the tire detected by this fluctuation detection unit.

In other words, as described above, as the condition of the fluctuation of vibration between a wheel and the surface of a tire shows a brake condition, a brake condition can be estimated by detecting this fluctuation according to the present invention. That is, unlike conventional methods which perform brake condition detection by detecting if the maximum brake force (the maximum coefficient of friction) has been reached when the wheel speed is reduced, the present invention determines a brake condition swiftly based upon the fluctuation of resonance vibration with a tire. Therefore, brake operations can be greatly enhanced.

Another aspect of the present invention provides a brake condition detector in which the fluctuation detection unit detects the fluctuation of resonance vibration based upon a vibration state detected by at least one of a wheel speed sensor, an acceleration sensor, a torque sensor and a strain gauge attached near the wheel.

In this way, a wheel speed sensor or an acceleration sensor attached to the vicinity of the wheel can be adopted as a vibration detection unit. Also, a component of acceleration can be extracted as the fluctuation of force applied to a wheel by using a torque sensor and a strain gauge in place of the acceleration sensor. That is, as the vibration of a wheel and vibration due to reflection by the surface of a tire can be detected by the wheel speed sensor and the acceleration sensor, the fluctuation of resonance vibration in the tire can be detected based upon this detected condition of vibration by using the fluctuation detection unit.

Another aspect of the present invention provides a brake condition detector in which the fluctuation detection unit detects the fluctuation of resonance vibration based on a change in a resonance frequency signal component.

One other aspect of the present invention provides a brake condition detector in which the brake condition detection unit detects the fluctuation of resonance vibration based on energy states of outputs generated by the fluctuation detection unit at different timings.

In this way, for example, a brake condition can be detected based upon the ratio of an energy condition corresponding to the vibrational waveform of a wheel and the vibrational waveform reflected at a fixed end of the tire.

One other aspect of the present invention provides a brake condition detector in which the brake condition detection unit detects a maximum brake condition of the wheel.

In this way, as the fluctuation of resonance vibration with a tire detected by a brake condition detection unit varies according to the brake condition, the maximum brake condition in which brake force is at a maximum can be detected based upon this fluctuation.

A further aspect of the present invention provides a brake condition detector in which the brake condition detection unit estimates a gradient of a coefficient of friction $\mu$ which indicates a brake condition of the wheel.

In this way, since a relationship exists between the fluctuation of resonance vibration in a tire detected by the vibrational condition detection unit and the gradient of a coefficient of friction $\mu$, the gradient of a coefficient of friction $\mu$ can be estimated based upon this relationship.

A further aspect of the present invention provides a brake condition detector in which the maximum brake condition is detected based upon change of the gradient of the coefficient of friction $\mu$.

In this way, since a relationship exists between the maximum brake condition and the gradient of a coefficient of friction $\mu$, the maximum brake condition can be detected based upon change of the gradient of the coefficient of friction $\mu$.

A yet further aspect of the present invention provides a brake condition detector in which the brake condition detection unit derives a value of an energy condition of a frequency band in which the fluctuation of resonance vibration is generated and estimates the gradient of the coefficient of friction $\mu$ from a change in such value.

In this way, as described above, because the relationship between energy applied from a wheel to a tire and energy reflected from the surface of the tire indicates a fluctuation condition, the gradient of a coefficient of friction $\mu$ can be estimated based upon the relationship between the above-described energies.

A yet further aspect of the present invention provides a brake condition detector in which the source of the resonance vibration is pulsation of hydraulic pressure generated by switching a solenoid valve of a hydraulic circuit which controls a brake condition of the wheel.

In this way, the pulsation of brake fluid caused by switching a solenoid valve in a hydraulic circuit for controlling a brake condition can be adopted as a source of resonance vibration in a tire.

That is, as the vibrational frequency of pulsation of brake fluid coincides at many portions with the frequency of resonance vibration and intensifies the resonance vibration in such tire, the fluctuation of resonance vibration in a tire can be reliably detected using this pulsation of brake oil and therefore, a condition of control can be suitably detected.

Another aspect of the present invention provides a brake condition detector in which the source of the resonance vibration is pulsation of hydraulic pressure generated when driving a pump motor for increasing and reducing hydraulic pressure in a wheel cylinder provided to the wheel.

In this way, pulsation of brake fluid caused by driving the motor of a pump for increasing and reducing hydraulic pressure in a wheel cylinder provided to a wheel can be utilized as the vibrational source of resonance vibration.

Another aspect of the present invention provides a brake condition detector in which the timing of pulsation of hydraulic pressure appearing in the wheel is estimated from a command signal to the source of the resonance vibration to determine a range of measurement of the fluctuation of resonance vibration.

In this way, the range for measuring fluctuation of resonance vibration in a tire can be set by estimating the timing of pulsation of brake fluid in a wheel from the command signal to the vibrational source of resonance vibration in the tire.

A yet further aspect of the present invention provides a brake condition detector which is constructed so that it is hardly affected by resonance from a suspension system in the vehicle and affected by vibrational energy of a frequency of a region having a large resonance gain.

In this way, because the detector and the controller are constructed so that they are hardly influenced by resonance caused by the suspension system of a vehicle and that vibrational energy at a frequency of an area having a large resonance gain can be received, the characteristics of a wheel speed sensor, an acceleration sensor and a filter to be used are suitably set as described above and thus, the fluctuation of resonance vibration in a tire can be readily detected.

A yet further aspect of the present invention provides a brake condition detector in which the resonance frequency of at least one of a suspension and a tire is adjusted so that resonance points of the suspension and the tire do not overlap.

In this way, because the resonance frequency of at least one of the suspension system and a tire is adjusted so that the resonance points of the suspension system and the tire are different, the fluctuation of resonance vibration with the tire can be readily detected.

One other aspect of the present invention provides a brake condition detector in which brake force is calculated when the gradient of coefficient of friction $\mu$ is lesser than a predetermined amount and a coefficient of friction $\mu$ is calculated based upon the brake force and a load of the wheel.

In this way, because the brake force can be calculated using pressure applied to a brake such as pressure in a master cylinder in the case of a brake condition in which the gradient of a coefficient of friction $\mu$ is at a maximum, a coefficient of friction $\mu$ can be calculated based upon the brake force and the load of the wheel. Therefore, precise anti-skid control can be executed using this coefficient of friction $\mu$.

Another aspect of the present invention provides a vehicle controller which includes an adjustment unit for adjusting hydraulic pressure in a vehicle wheel cylinder based upon a brake condition detected by a brake condition detector and a control unit for controlling a brake force of a vehicle wheel to perform anti-skid control for the vehicle.

In this way, the brake force of a wheel can be controlled to perform anti-skid control by adjusting hydraulic pressure in a wheel cylinder based upon a brake condition detected by the brake condition detector.

Therefore, unlike conventional devices in which anti-skid control is performed by detecting the decrease of the wheel rotation speed, in the present invention, anti-skid control can be swiftly performed by directly estimating the maximum brake condition based on, for example, the gradient of a coefficient of friction $\mu$. In addition, because a brake condition can be detected speedily, maintaining the maximum brake condition will be easy and brake performance is greatly enhanced. Furthermore, even if the coefficients of friction of the surface of a road change, anti-skid control can be swiftly and reliably performed and brake performance is greatly enhanced.

A yet further aspect of the present invention provides a vehicle controller in which the control unit performs anti-skid control for a vehicle based on at least one of a gradient which indicates of a coefficient of friction $\mu$ of the wheel, wheel speed and wheel acceleration. In this way, anti-skid control can be suitably performed.

A yet further aspect of the present invention provides a vehicle controller which includes an adjustment unit for adjusting hydraulic pressure in a vehicle wheel cylinder based upon a brake condition detected by a brake condition detector and a control unit for controlling brake forces of right and left vehicle wheels to control vehicle yawing. In this way, undesirable rotational movements of the vehicle can be swiftly and reliably controlled.

A yet further aspect of the present invention provides a vehicle controller in which the control unit controls vehicle yawing based on at least one of a gradient showing a change of a coefficient of friction $\mu$ of a vehicle wheel, wheel speed and wheel acceleration. In this way, yawing of the vehicle can be suitably controlled according to the above-described control amount.

BRIEF DESCRIPTION OF THE DRAWINGS

Additional objects and advantages of the present invention will be more readily apparent from the following detailed description of preferred embodiments thereof when taken together with the accompanying drawings in which:

FIG. 4 is a schematic block diagram showing of an overall vehicle control system according to a first embodiment of the present invention;

FIG. 7 is a flowchart of a control procedure according to the first embodiment;

DETAILED DESCRIPTION OF THE PRESENTLY PREFERRED EXEMPLARY EMBODIMENTS

Figure 1:
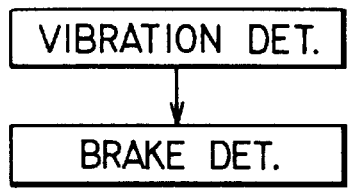
FIG. 1 is a schematic block diagram showing the present invention.
Figure 3:
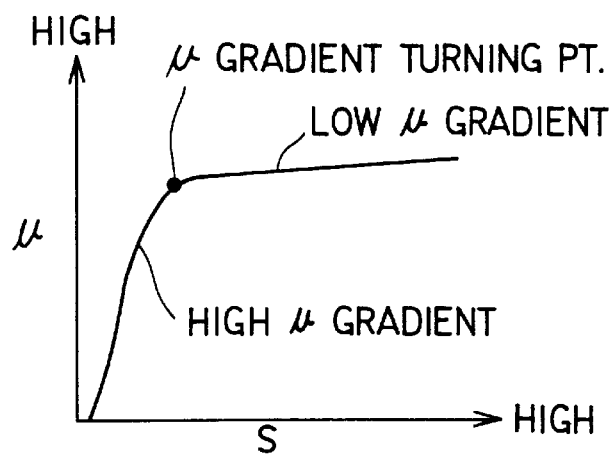
FIG. 3 is an explanatory drawing showing a gradient of a coefficient of friction $\mu$.

Preferred embodiments of the present invention are described hereinafter with reference to the accompanying drawings.

FIG. 4 is a schematic block diagram showing the construction of an overall vehicle control system to which the present invention is applied. This embodiment is an example in which the present invention is applied to a front engine and front drive (FF) four-wheel vehicle.

As shown in FIG. 4, a front left wheel FL, a front right wheel FR, a rear left wheel RL and a rear right wheel RR of the vehicle are each provided with wheel cylinders (W/C) 2FL, 2FR, 2RL and 2RR for applying brake force to each wheel FL-RR and wheel speed sensors 4FL, 4FR, 4RL and 4RR for detecting the rotation speed of each wheel FL-RR. The right and left front wheels FL, FR which function as driving wheels are designed to be rotated by a driving force from an internal combustion engine 10 coupled to the wheels via a transmission 6 and a differential gear 8. The internal combustion engine 10, which is the source of driving power, is provided with sensors for detecting various operating conditions such as rotation speed, intake air amount, circulating water temperature and throttle valve aperture.

A detection signal from a wheel speed sensor attached to each wheel FL-RR is provided to an anti-skid control electronic control unit (ABS (anti-brake system) control ECU) 20. This ABS control ECU 20 is constructed as a microcomputer which mainly includes CPU, ROM and RAM.

This ABS control ECU 20 executes anti-skid control (ABS control) for suppressing slips that occur in a wheel during vehicle braking by controlling each solenoid valve in an oil hydraulic circuit 40 provided in a fluid path from a master cylinder (M/C) 34 that discharges brake fluid when a brake pedal 32 is pressed to W/Cs 2FL-2RR of wheels FL-RR. The ABS control ECU 20 operates with the receipt of a detection signal from a sensor (not shown) provided in a brake switch 36 (hereinafter referred to as brake SW) that is actuated when a brake pedal 32 is pressed and detection signals from pressure sensors (not shown) that are provided in the oil hydraulic circuit 40 for detecting oil pressure in W/Cs 2FL, 2FR of driving wheels FL, FR in addition to the receipt of above-described detection signals detected from each of the wheel speed sensors 4FL-4RR. Next, the above-described hydraulic circuit 40 will be described.

Figure 5:
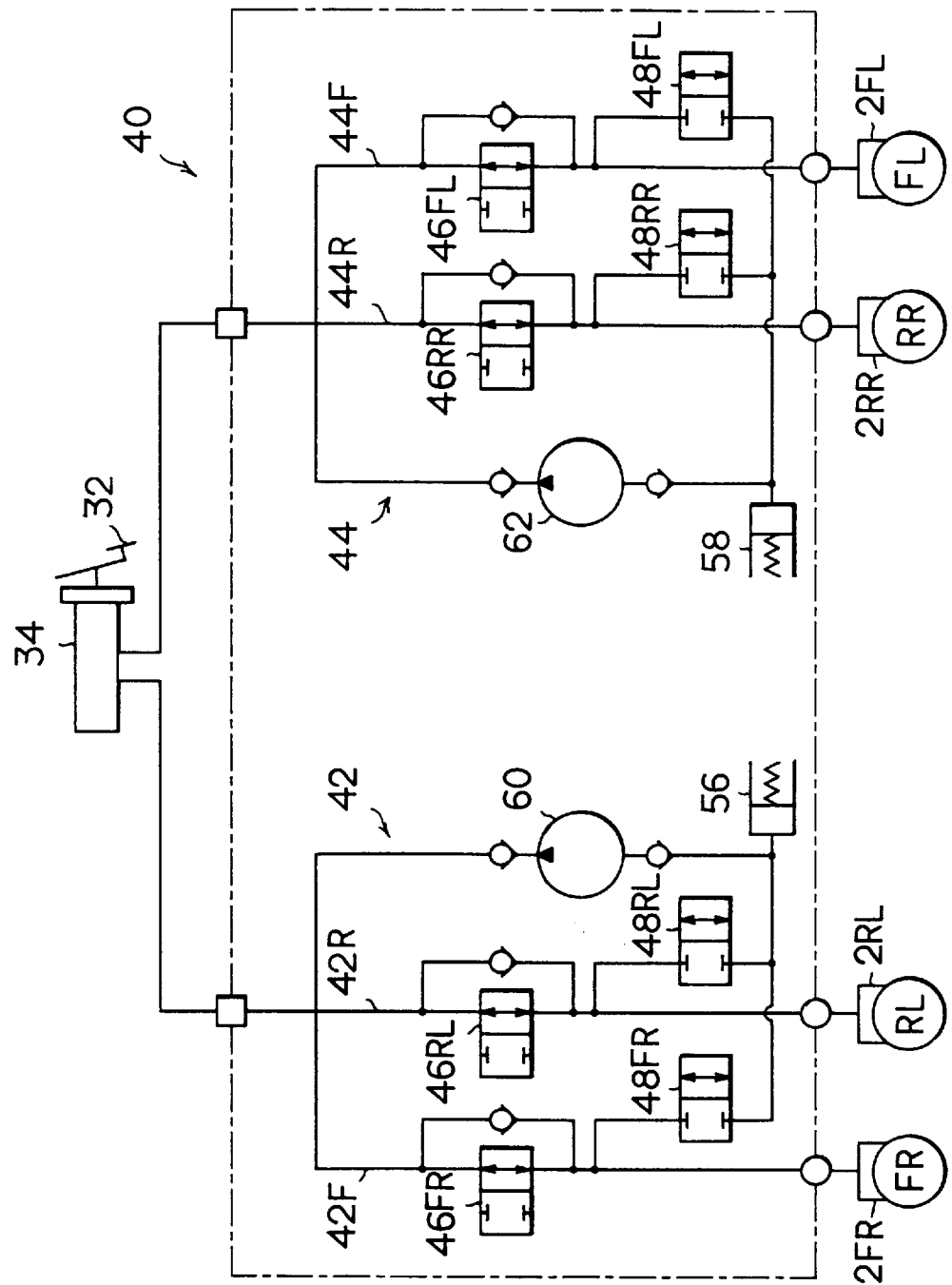
FIG. 5 is an explanatory drawing showing the construction of an oil hydraulic circuit according to the first embodiment.

As shown in FIG. 5, the hydraulic circuit 40 is provided with two groups of fluid paths 42 and 44 for respectively supplying brake oil force fed from two paths of the M/C 34 to the front right wheel FR, the rear left wheel RL, the front left wheel FL and the rear right wheel RR. In fluid paths 42, 44, fluid paths 42R, 44R which respectively lead to W/Cs 2RL, 2RR of the rear left and right wheels RL, RR, which are the driven wheels, are provided with maintenance valves (pressure increase control valves) 46RL, 46RR for switching to a pressure increase position by opening the paths 42R, 44R or a pressure maintain position by closing the paths and pressure reduction valves (pressure reduction control valves) 48RL, 48RR for discharging brake fluid into each WIC 2RL and 2RR.

The pressure increase control valves 46RL, 46RR are normally in the pressure increase position and are switched to the pressure maintain position when energized by the ABS control ECU 20. The pressure reduction control valves 48RL, 48RR are normally closed and are opened when energized by the ABS control ECU 20 to discharge brake oil to W/C 2RL, 2RR.

Meanwhile, fluid paths 42F and 44F to W/Cs 2FL and 2FR of the front right and left wheels FL, FR, which are driving wheels, in fluid paths 42, 44 are respectively provided with pressure increase control valves 46FR, 46FL similar to the control valves that are provided in the fluid paths 42R, 44R in the side of the driven wheels RL, RR and pressure reduction control valves 48FR and 48FL.

Also, fluid paths 42, 44 are respectively provided with reservoirs 56, 58 for temporarily storing brake fluid respectively discharged from the pressure reduction control valves 48FL, 48RR and pumps 60, 62 for further force feeding the brake fluid to fluid paths between M/C 34 and the pressure increase control valves 46FL, 46RR.

Next, an outline of ABS control executed by the above-described ABS control ECU 20 will be described. If ABS control is not being executed, all solenoid valves in the hydraulic circuit 40 are normally deactuated. More concretely, for example, as pressure control valves of the W/Cs 2FL, 2FR in the driving wheels side, pressure increase control valves 46FL, 46FR are open and the pressure reduction control valves 48FL, 48FR are closed.

For example, if slips occur in each of the wheels FL-RR due to a sudden brake operation of a driver at a road having a low coefficient of friction $\mu$, ABS control is started, the motor is driven to operate pumps 60, 62 together with appropriately switching the brake pressure inside the W/C 2FL-2RR to the pressure reduction, pressure maintain and pressure increase states in accordance with the slip conditions of the vehicle wheels FL-RR by deactuating and actuating the pressure increase control valves 46FL-46RR and the pressure reduction control valves 48FL-48RR which are the control valves.

In more concrete terms, if a vehicle wheel is determined to have a tendency to lock, the pressure control valves are controlled so that they are in a pressure reduction position (that is, the pressure increase control valves are actuated (closed) and the pressure reduction control valves are actuated (opened)) to reduce the pressure of brake fluid in each W/C 2FL-2RR and prevent the wheel from locking. At this point, the brake fluid discharged from each W/C 2FL-2RR is discharged into reservoirs 56, 58 through the pressure reduction control valves 48FL-48RR and furthermore, the brake fluid stored in the reservoirs 56, 58 is circulated to a normal brake system by driving the motor.

If it is determined that the tendency of the wheel to lock has disappeared during the execution of ABS control, the pressure control valves of W/C 2FL-2RR are controlled so that they are in a pressure increase position (that is, the pressure increase control valves are deactuated (opened) and the pressure reduction control valves are deactuated (closed)) to increase the oil pressure in the W/C 2FL-2RR. Moreover, a wheel is prevented from locking and the stability of a vehicle is secured by first controlling the pressure control valves to a pressure maintain position (that is, the pressure increase control valves are actuated (closed) and the pressure reduction control valves are deactuated (closed)) to maintain the hydraulic pressure in each W/C 2FL-2RR, and then hydraulic pressure in each W/C 2FL-2RR is gradually increased because the wheels tend to lock when hydraulic pressure in each W/C 2FL-2RR is rapidly increased.

Next, a brake condition detection process and ABS control executed by the ABS control ECU 20 based upon the brake condition will be described with reference to FIGS. 6A–13 and FIG. 16.

First, the principle of detection of a brake condition based on a parameter RP of the coefficient of friction $\mu$ gradient will be briefly described with reference to FIGS. 6A–6C.

Figure 6A:
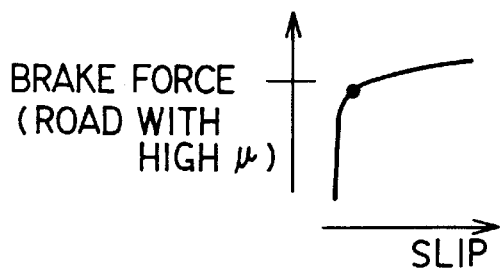
FIGS. 6A–6C are graphs showing the principle of estimating the gradient of a coefficient of friction $\mu$ using RP.
Figure 6B:
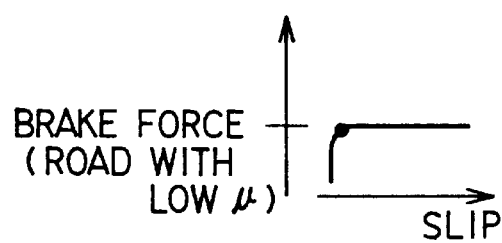

The inventors of the present invention found out through experiments that for roads having low $\mu$ such as slippery icy roads and the like and those roads having a high $\mu$ such as the usual dry road, the relationship between slip rates and brake force F is as shown in FIGS. 6A and 6B. Because brake force F shown by the vertical axes of graphs shown in the figures can be expressed as a product of the coefficient of friction $\mu$ and a wheel load N, that is, $F=\mu \cdot N$, then, the vertical axis functions as an index showing $\mu$ if the load N of the wheel is set to be constant. Therefore, the gradient of these graphs is equivalent to the $\mu$ gradient.

Figure 6C:
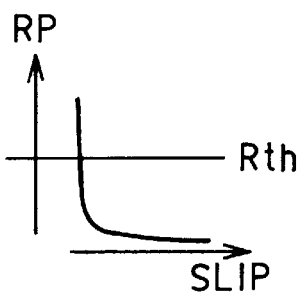

If RP (=Pout/Pin) which denotes a ratio of an energy condition described later is used as the parameter of the $\mu$ gradient, the graph will be as shown in FIG. 6C.

The relationship shown in FIG. 6C shows that RP decreases when the $\mu$ gradient decreases for both the road with a large coefficient of friction $\mu$ and the road with a small coefficient of friction $\mu$ and that RP approaches a threshold value Rth as shown in FIG. 6C at a predetermined $\mu$ gradient which shows the maximum brake force as shown in FIGS. 6A and 6B.

Figure 16:
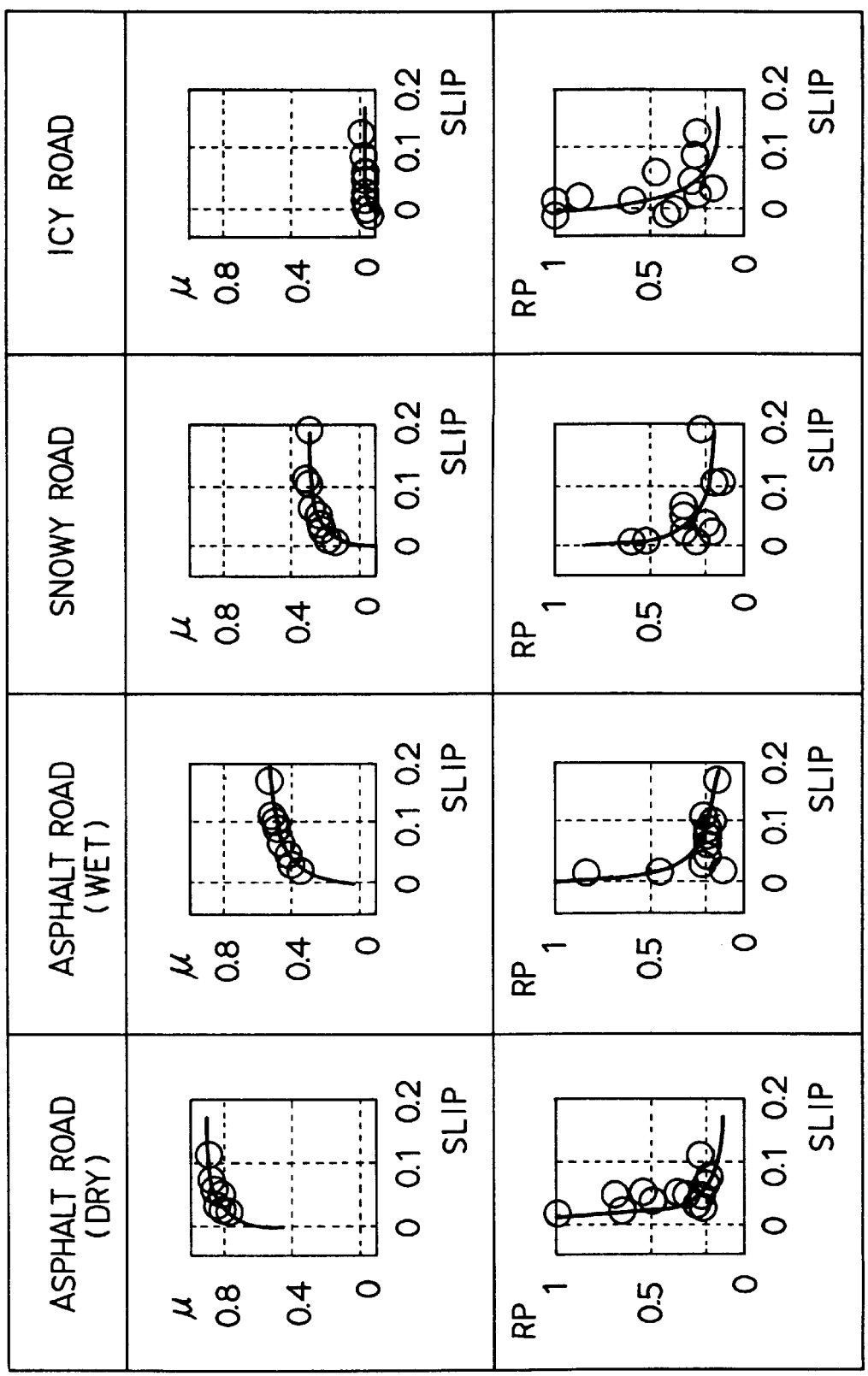
FIG. 16 is a graph showing the relationships between a slip rate on each road, coefficient of friction $\mu$ and RP.
Figure 17A:
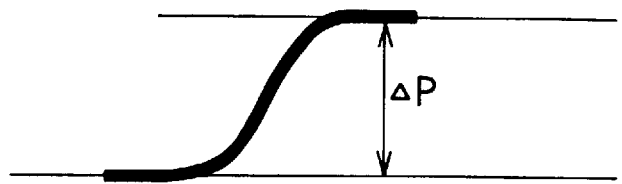
FIG. 17 is an explanatory drawing showing a conventional anti-skid control technique.
Figure 17B:
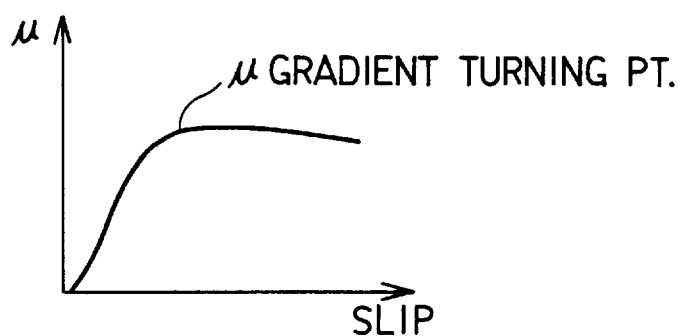
Figure 17C:
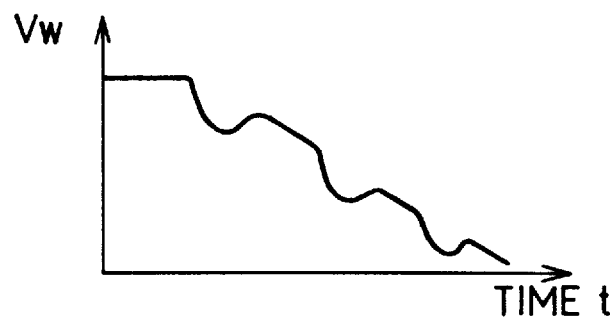
Figure 17D:
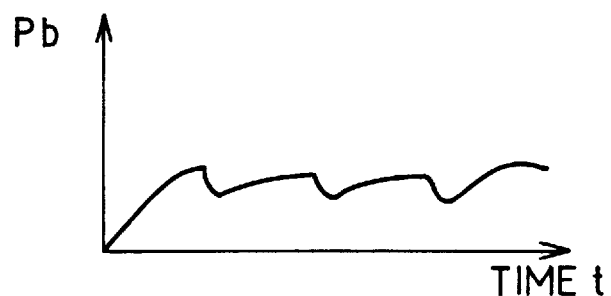

Meanwhile, FIG. 16 shows the relationship between slip rates on the surface of each road and coefficient of friction $\mu$ thereof or RP obtained through experiments. These experiment results support the relationships shown in FIGS. 6A–6C.

Therefore, the state of the $\mu$ gradient, in other words, the brake condition, can be accurately determined by calculating RP which is a parameter of the $\mu$ gradient.

Next, brake condition detection and ABS control will be described based on a flowchart shown in FIG. 7. It must be noted here that this process is executed if a condition to start ABS control is satisfied; for example, if the slip rate exceeds a predetermined value.

Step 100 computes wheel speed Vw based on the output from the wheel speed sensors 4FL-4RR.

Figures 8A, 8B:
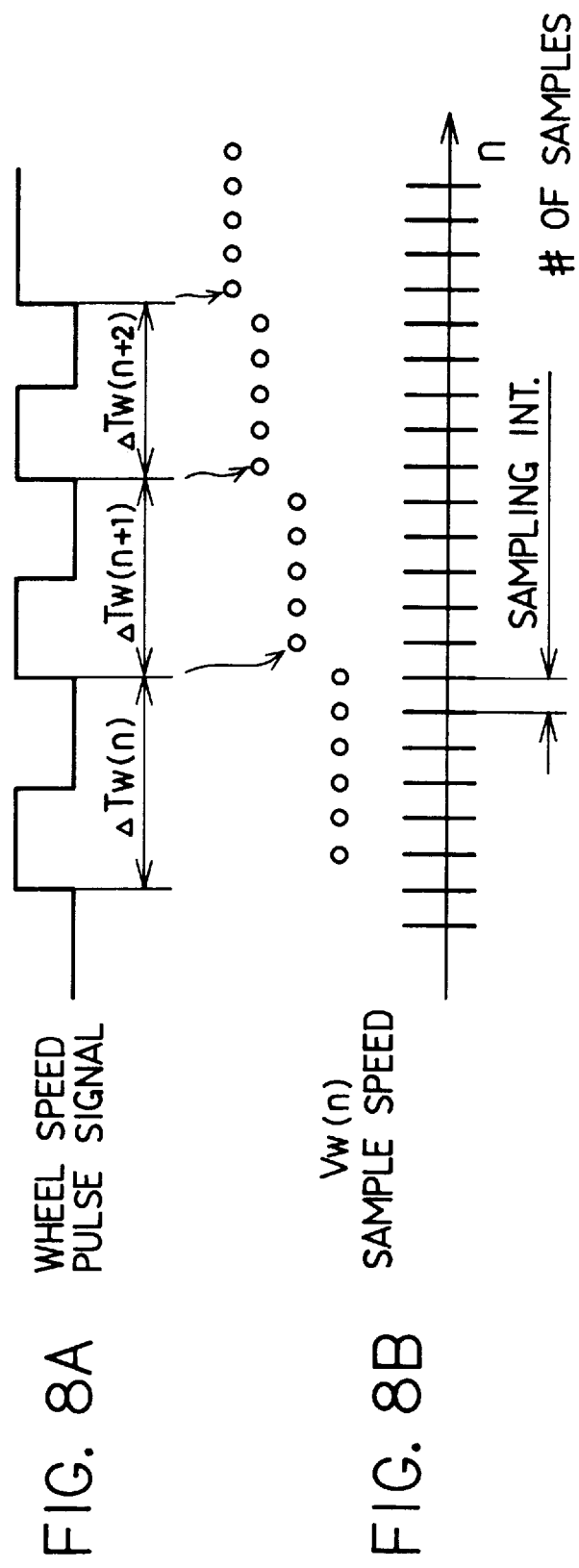
FIGS. 8A and 8B are explanatory drawings showing the time index data of wheel speed according to the first embodiment.

For example, as shown in FIGS. 8A and 8B, a wheel speed pulse signal can be obtained in accordance with wheel speed and wheel speed Vw is computed based on Eq. (1) after measuring the time ΔTw between wheel velocity pulse signals.

$$Vw(n)=k1 / \Delta Tw(n) \tag{1}$$

Here, k1 represents a constant value.

Subsequent step 110 executes band-pass filtering which is described below.

First, as shown in FIGS. 8A and 8B, the sampling data of wheel data is converted to time series data. That is, wheel speed Vw is calculated using the time ΔTw between pulse signals according to the above-described Eq. (1) with the time series data being obtained by setting this wheel speed Vw as the sample speed for each sample timing.

While the time series data for the present embodiment is obtained by using output from the wheel speed sensors 4FL-4RR, it may also be that the time series data is obtained based on the outputs from the acceleration sensor.

Figure 9:
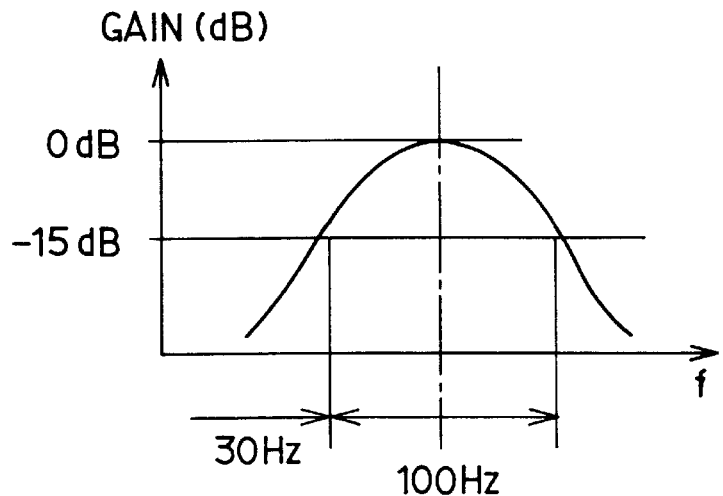
FIG. 9 is a graph showing filter transmission characteristics in the first embodiment.
Figure 2A:
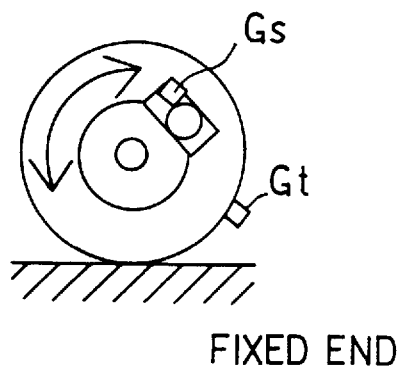
FIGS. 2A–2D are explanatory drawings showing the basic principle of the present invention.
Figure 2B:
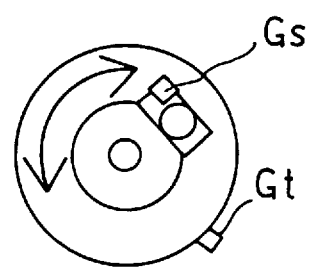
Figure 2C:
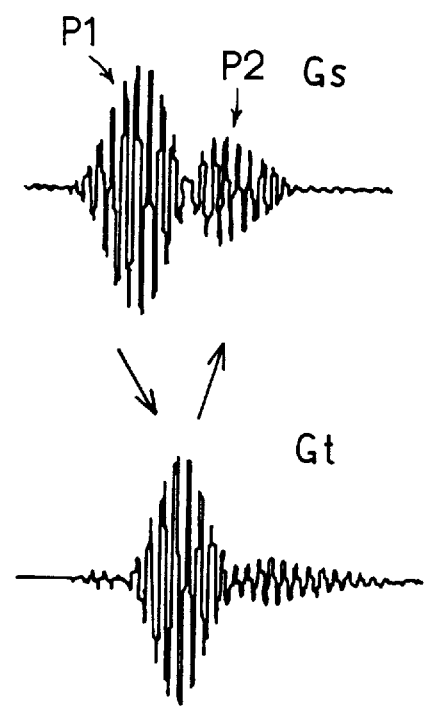
Figure 2D:
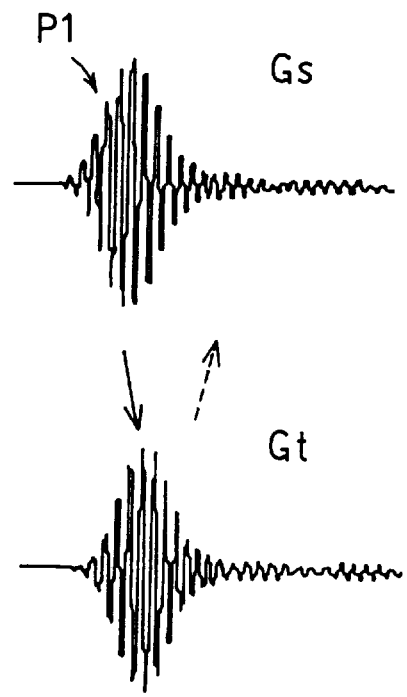

Band-pass filter processing using a band-pass filter having filter transmission characteristics shown in FIG. 9 is performed on the time series data obtained above to reduce alias errors, computation errors and the like in power measurement intervals described later.

A FIR (Finite Duration Impulse Response) filter having constant-delay characteristics is used here.

Here, while the characteristics of the filter are so set that only vibrational energy of a specific frequency band is received, other types of filters may also be set other than the one used here. For example, digital filter computational load can be reduced by having a construction in which the peak gain of the tire resonance band is obtained when the acceleration sensor (G sensor) is used for detection. In addition, the wheel speed sensor needs to be constructed in such a way that tire resonance band signals can be detected even at low speeds and moreover, the sensor should be selected based on the number of its teeth.

Step 120 performs window processing which is described below.

In the present embodiment, vibrational energy is measured after driving the solenoid valves of the hydraulic circuit 40 by applying a window of a specific frequency to a band-pass filtered waveform over two locations which are a location where first vibration is detected as a result of the fluctuation phenomenon and a location where vibration reflecting the condition on the tire surface is detected. In other words, only vibrations at the predetermined timing are extracted.

Figure 10:
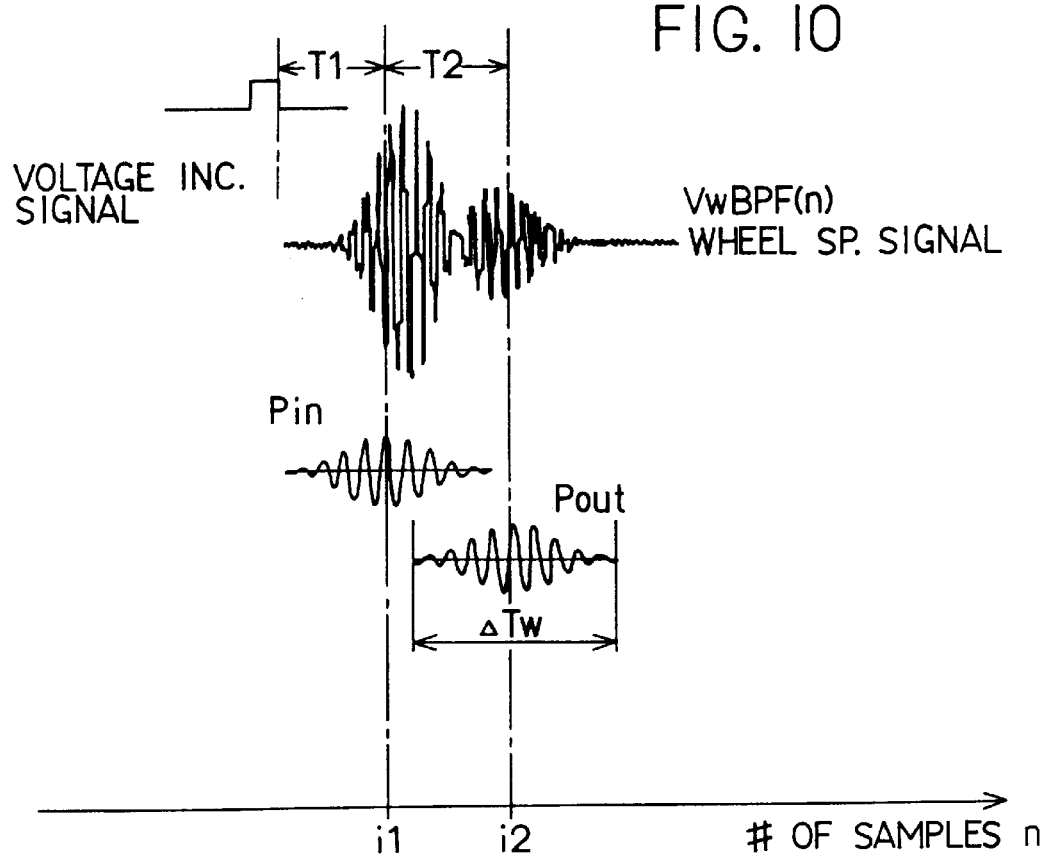
FIG. 10 is an explanatory drawing showing an application of a window in the first embodiment.

More concretely, as shown in FIG. 10, measurements are performed at a width of ΔTw at two locations which are a time interval T1 from the actuation of the solenoid valve as indicated by an actuation signal up to i1 and a time interval T2 from i1 to i2.

VwBPF (n) is the speed signal obtained after processing Vw (n) using a band-pass filter, Pin denotes vibrational energy in a location where a first vibration is detected and Pout denotes vibrational energy in a location where a vibration reflecting tire surface condition is detected.

Step 130 performs an energy measurement process which is described below.

Vibrational energy is obtained by integrating components of the detection frequency inside the window. The window is expressed as in Eq. (2) below. It must be noted here that a general Hamming window is used in the present embodiment.

$$g(m)=0.42-0.5\cdot\cos[2\pi\cdot m/(L-1)]+0.08\cdot\cos[4\pi\cdot m/(L-1)] \quad (2)$$

In Eq. (2), L which indicates the number of samples inside the window is obtained by multiplying window width $\Delta Tw$ with sampling frequency fs, that is, $L=\Delta Tw\cdot fs$. If a detection frequency is set as fd, then the value of k which is in the subsequent Eq. (3) is computed as $k=fd\cdot L/fs$. It must be noted that both L and k must be integers and so the values after the decimal point are truncated.

Figure 11A:
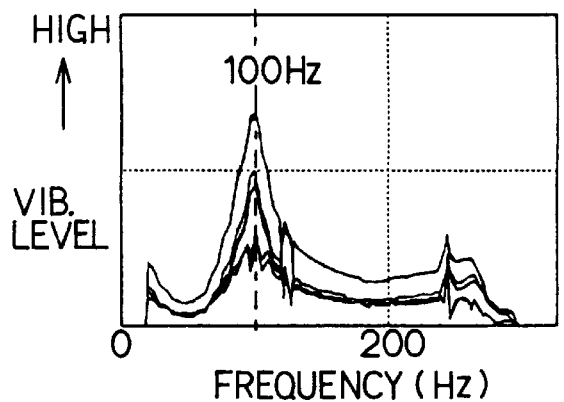
FIGS. 11A–11D are graphs showing the relationship between a frequency of pulsation of oil pressure and a wheel speed signal in the first embodiment.

In the present embodiment, detection frequency fd is set to 100 Hz. (Sampling frequency fs is set to 1200 Hz.) As shown in FIG. 11A, a resonance frequency between brake fluid pulsation which is a vibrational source and a tire which is a resonant element coincide with each other in the vicinity of 100 Hz ($\pm 15$ Hz) and so, detection of the tire vibration that has been intensified by the hydraulic pressure vibration is readily detected in the vicinity of 100 Hz.

Figure 11B:
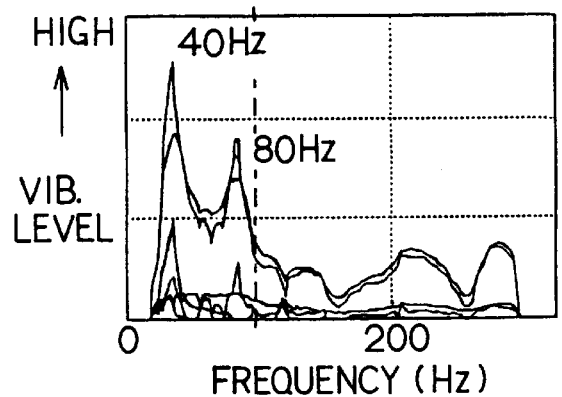
Figure 11C:
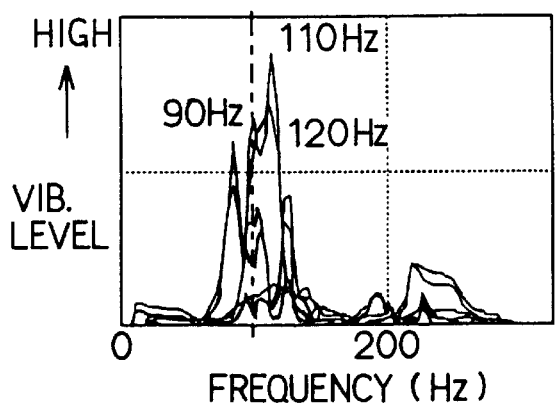
Figure 11D:
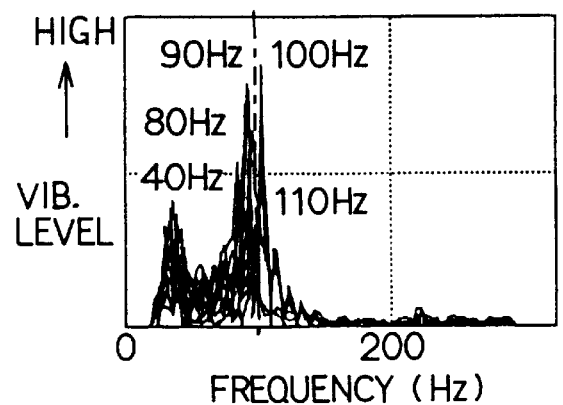

FIGS. 11A–11D are explanatory drawings showing transmission of vibration. FIG. 11A shows vibration of the vibration source which is the pulsation of hydraulic pressure. FIG. 11B shows the resonance vibration due to the suspension system. FIG. 11C shows the resonance vibration due to the tires. FIG. 11D shows the wheel speed signals. As shown by FIGS. 11A and 11B, in this embodiment, vibration which is hardly influenced by resonance with the suspension system and readily influenced by resonance with the tire is generated by brake fluid pulsation and resonance signals between the wheels and the tire surface are detected by the wheel speed sensors.

Moreover, a vibration having a frequency which is readily affected by tire resonance can also be generated by controlling a parameter which influences a volume expansion rate of a pipe between a vibration source and a wheel cylinder, i.e., adjusting pipe length or pipe diameter. In this case, for example, pipe adjustments can be made based on an orifice which may be placed in front of the wheel cylinder or in the vicinity of a pump discharge port. Also, an orifice in a communicable position with a pressure increase valve may also be used here. Furthermore, for example, if the resonances in the tires of the two rear wheels is around 60 Hz, then resonance due to the hydraulic pressure movement which is the source of vibration can be made to coincide with such tire resonances by elongating the pipe or by adding an orifice. In this way, tire resonance and hydraulic pressure pulsation resonance can be made to coincide without adjusting the driving of the vibrational source and the like.

If L and k are set as described above, the ith vibrational energy of the wheel speed signal sequence Vw is obtained as P (i,k) using the following Eq. (3). As described above, vibrational energy during time T1 is computed as Pin and vibrational energy during time T2 is computed as Pout.

$$W(k, m) = \exp(j2\pi/Lkm) \quad (3)$$

$$P(i, k) = \left| \sum_{m=0}^{L-1} VwBPF(i - L/2 + m)g(m)W(k, m) \right|$$

Here, W (k,m) denotes a rotator and g(m) W(k,m) denotes a part of a window on a specific frequency.

In the next step 140, RP which is a parameter of the $\mu$ gradient is calculated using Eq. (4).

$$RP=Pout/Pin \quad (4)$$

Figure 12:
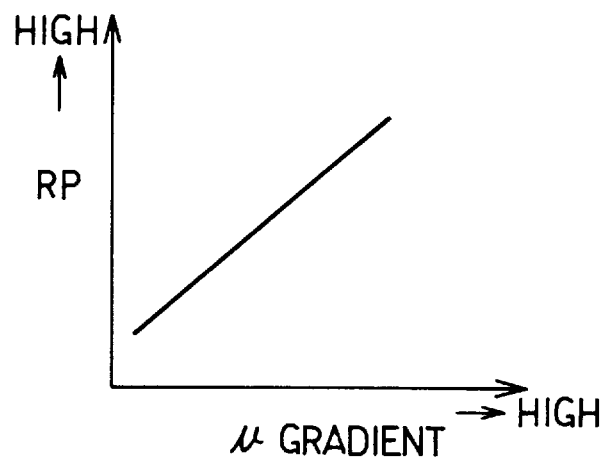
FIG. 12 is a graph showing the relationship between RP and the gradient of a coefficient of friction $\mu$ in the first embodiment.

In short, the parameter RP of the $\mu$ gradient is a value indicating the fluctuation state of the vibration. Because the relationship between the parameter RP of the $\mu$ gradient and the $\mu$ gradient is as shown in FIG. 12, the $\mu$ gradient is practically obtained by computing the parameter RP.

Step 150 computes vehicle speed VB from the rotation speed of the driven wheels based on the signals from the wheel speed sensors 2FL-2RR.

Step 160 computes an acceleration term Acc based on the wheel speed Vw and the vehicle speed Vb using the following Eq. (5).

$$Acc=d(Vw-VB)/dt \quad (5)$$

Step 170 computes a speed term Sp based on the wheel speed Vw and the vehicle speed VB using the following Eq. (6). Here, $k3\cdot VB$ denotes a target speed.

$$Sp=(Vw-k3\cdot VB) \quad (6)$$

Step 180 computes a speed parameter WP from Acc and Sp using the following Eq. (7). Here, k1 and k2 denote predetermined coefficients.

$$WP=k1\ (Vw-k3\cdot VB)+k2d(Vw-VB)/dt \quad (7)$$

Figure 13:
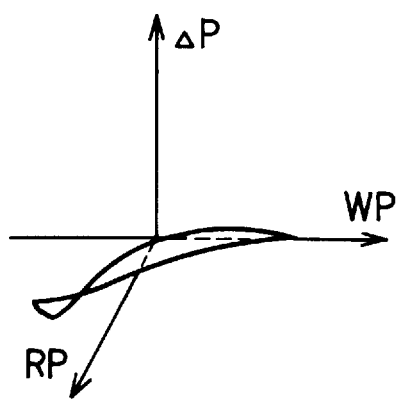
FIG. 13 is a graph showing the relationship between RP, WP and ΔP in the first embodiment.

Using a three-dimensional map shown in FIG. 13 between RP which is the parameter of the $\mu$ gradient, speed parameter WP and an amount of increased or reduced pressure $\Delta P$ of the W/C, step 190 computes the amount of increased or reduced pressure $\Delta P$ based on the parameter of the $\mu$ gradient RP and the speed parameter WP and then, the above process terminates.

If the relationship shown in FIG. 13 is expressed mathematically, the following Eqs. (8) and (9) can be obtained.

when WP>0, $$\Delta P=kp1-\cdot RP+kp2\cdot(kp3+RP)\cdot WP \quad (8)$$

when $WP\leq 0$, $$\Delta P=kp1-RP+kp4/(kp5+RP)\cdot WP \quad (9)$$

It must be noted here that kp1–kp5 in Eqs. (8) and (9) denote constant values.

Also, it must be noted here that steps 110–140 may be considered as part of a fluctuation detection means while steps 160–180 may be considered as part of a brake condition detection means.

As described above, in the present embodiment, the parameter RP which is an index for indicating the $\mu$ gradient that corresponds to the vibrational energy can be obtained by performing band-pass filter processing, window processing, energy calculation processing and gradient parameter processing on the outputs from the wheel speed sensors 4FL-4RR. The amount of pressure increase or reduction $\Delta P$ in the W/C 2FL-2RR can be obtained based upon the $\mu$ gradient parameter RP and the velocity parameter WP.

That is, there is that advantage of being able to perform swift and reliable ABS control because the use of the $\mu$ gradient parameter RP enables faster detection of the brake state as compared with conventional methods.

Next, a second embodiment will be described hereinafter.

In the present embodiment, brake force F and the maximum brake force Fmax are obtained using the wheel speed Vw obtained in step 100 and the parameter RP of the $\mu$ gradient obtained in step 140 of the control process shown in FIG. 7 of the first embodiment. In the present embodiment, descriptions of hardware and control processing similar to that of the first embodiment are either omitted or simplified.

Figure 14:
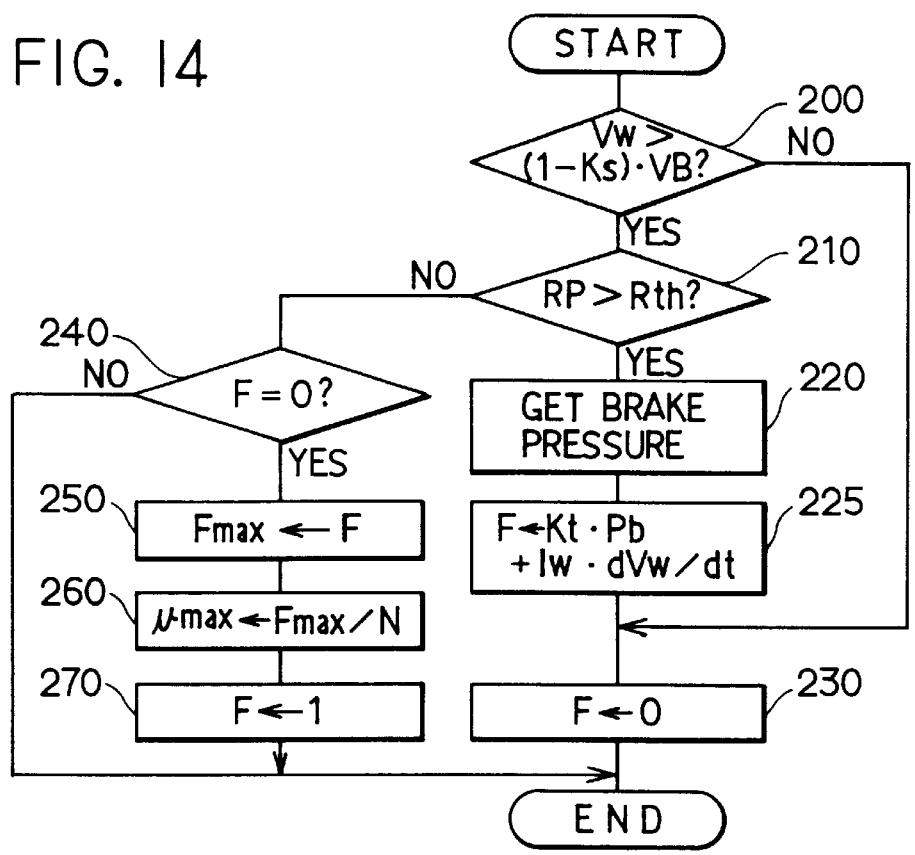
FIG. 14 is a flowchart of a control procedure according to a second embodiment of the present invention.

As shown in FIG. 14, step 200 determines whether the wheel speed Vw exceeds a predetermined value (1−Ks)·VB or not. It may also be that step 200 determines whether the absolute value of dvw/dt exceeds Ka or not. It must be noted here that Ks denotes a constant that corresponds to a slip rate and Ka denotes a constant that corresponds to acceleration.

In other words, when a slip rate decreases significantly and wheel speed acceleration (including deceleration) is large, the system is in a transitional state in which the balance between brake torque generated by the wheel hydraulic pressure and the brake force is upset and the estimation of F is bypassed because the sampling precision of Pb and Vw used in an expression (10) described later cannot be maintained. It must be noted here that generally when the slip rate decreases significantly, the $\mu$ gradient is small and the value of F does not vary much. Reductions in the wheel speed and acceleration obtained using the above-described Eqs. (5) and (6) are fed back and controlled by ABS control. When step 210 gives a positive output, control goes to step 210. On the other hand, when step 210 gives a negative output, control goes to step 230.

Step 210 determines if the $\mu$ gradient parameter RP exceeds a predetermined threshold Rth or not. That is, as this threshold Rth is set to a value corresponding to a point (a peak of $\mu$) where the $\mu$ gradient greatly varies from a steep gradient to a gentle gradient, thus if step 210 gives a positive output, then it is determined that the maximum brake force has not been attained yet and control goes to step 220. On the other hand, if step 210 gives a negative output, control goes to step 240.

Step 220 computes the brake hydraulic pressure Pb. That is, W/C hydraulic pressure is obtained through estimation or measurements using a pressure sensor.

Step 225 computes the brake force F using Eq. (10).

$$F = kt \cdot Pb + Iw \cdot dVw/dt \quad (10)$$

Here, Pb denotes brake hydraulic pressure (that is, the W/C hydraulic pressure), kt denotes a brake torque conversion constant, Iw denotes moment of inertia of a wheel and Vw denotes the wheel speed.

Step 230 resets a flag F which indicates if the present brake force has reached the maximum level and processing terminates.

On the other hand, if step 210 gives a negative output, control goes to step 240 which determines if the flag is reset or not. In other words, step 240 determines if is the first time the maximum brake force has been attained or not. If step 240 gives a positive output, control goes to step 250. On the other hand, processing is terminated if step 240 gives a negative output.

Step 250 sets the brake force F computed using Eq. (1) as the maximum brake force Fmax.

Step 260 divides the maximum brake force Fmax by the wheel load N and stores the result as $\mu$max.

Step 270 sets the flag F which indicates the maximum brake force has been reached and thus, processing terminates.

As described above, in this embodiment, the maximum brake force can be obtained by using the $\mu$ gradient parameter RP. As the peak of $\mu$ can be obtained based upon the maximum brake force, a brake condition can be suitably known and this contributes to safe operation.

Because determining whether the present brake force has reached the maximum level or not can be done swiftly based on the $\mu$ gradient parameter RP, ABS control that keeps the present brake force at the maximum level for a long period of time can be readily performed.

Next, a third embodiment will be described hereinafter.

This embodiment is one example in which brake force obtained in the above-described second embodiment is used for yaw control. In the present embodiment, descriptions of the constitution of hardware and control processing which are already explained in the above-described first and second embodiments are either omitted or simplified.

Figure 15:
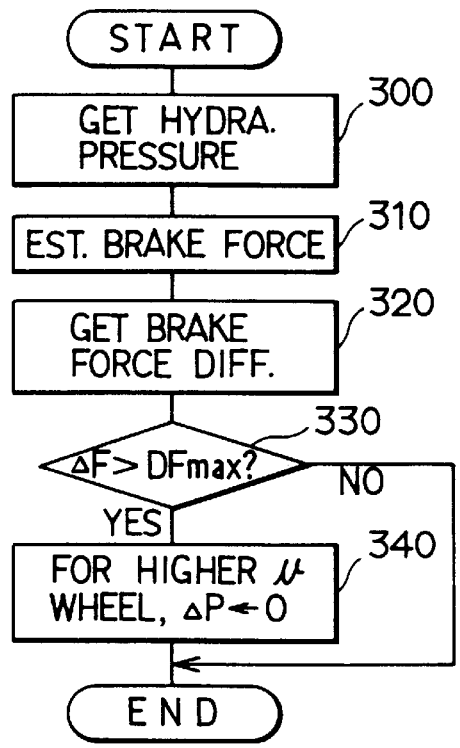
FIG. 15 is a flowchart of a control procedure according to a third embodiment of the present invention.

As shown in FIG. 15, step 300 detects the brake hydraulic pressure Pb. In other words, W/C hydraulic pressure is obtained through estimation or measurements.

Step 310 computes brake force F using the above-described Eq. (10).

Step 320 computes the difference ΔF in the brake force F in the right and left wheels.

Step 330 determines if this difference ΔF in brake force between the right and left wheels is larger than a value DFmax. If step 330 gives a positive output, control goes to step 340. On the other hand, if step 330 gives a negative output, this process terminates.

Step 340 sets to zero the control hydraulic pressure ΔP (amount of increased or reduced pressure) for the hydraulic pressure in W/C provided to a wheel on the side where the coefficient of friction is large, that is, the slip rate is large and processing is terminated. This control oil pressure ΔP is a value calculated based upon the gradient parameter RP in step 190 in the above-described first embodiment.

As described above, in this embodiment, as yaw control is being executed by adjusting the control hydraulic pressure ΔP based upon the difference ΔF in brake force between right and left wheels, the undesirable rotational movements of the vehicle can be suitably controlled.

It must be noted here that the present invention is not in any way limited to the above-described embodiments and so it goes without saying that the present invention encompasses a variety of embodiments that do not depart from the spirit of the present invention.

For example, because the idea here is that the determination of the brake condition at the tire surface based on the resonant vibration of the tire can be detected from the vibration from the wheel part which fluctuates between the wheel part and the tire surface part and appears again at the wheel part after a certain time lag, it goes without saying that the use of the autocorrelation function of vibration generated in a wheel is also within the scope of the present invention.

Eqs. (11) and (12) are equations which use autocorrelation function. The same window as the one expressed by Eq. (2) is used here because processing is done in a limited sampling interval.

$$R(i, k) = \sum_{m=0}^{L-1} VwBPF(i - L/2 + m)g(m)W(k, m) \quad (11)$$

Using Eq. (11), an auto-correlation value RC between points i1 and i2 for a specific frequency is as shown by Eq. (12).

$$RC = |R(i1, K) \cdot \overline{R(i2, k)}| \quad (12)$$

In other words, control using the same control map as the gradient parameter RP can be performed based upon this value RC or a change of this value RC.

Although the present invention has been fully described in connection with preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. A brake condition detection system comprising:

fluctuation detection means for detecting fluctuation of resonance vibration in a tire of a wheel of a vehicle based on vibrational energy fluctuating between an inertia of a tire wheel and an inertia of a surface of the tire;

brake condition detection means for detecting a brake condition of said wheel based upon said fluctuation of resonance vibration detected by said fluctuation detection means.

2. A brake condition detection system according to claim 1, wherein:

said fluctuation detection means is further for detecting said fluctuation of resonance vibration based upon a vibration state detected by at least one of a wheel speed sensor, an acceleration sensor, a torque sensor and a strain gauge coupled to said wheel.

3. A brake condition detection system according to claim 1, wherein:

said fluctuation detection means is further for detecting said fluctuation of resonance vibration based on a change in a resonance frequency signal component.

4. A brake condition detection system according to claim 1, wherein:

said brake condition detection means is further for detecting said brake condition based on energy states of outputs generated by said fluctuation detection means at different timings.

5. A brake condition detection system according to claim 1, wherein:

said brake condition detection means is further for detecting a maximum brake condition of said wheel.

6. A brake condition detection system according to claim 1, wherein:

said brake condition detection means is further for estimating a gradient of a coefficient of friction which indicates a brake condition of said wheel.

7. A brake condition detection system according to claim 6, wherein:

said brake condition detection means is further for detecting said brake condition based upon change of said gradient of said coefficient of friction.

8. A brake condition detection system according to claim 6, wherein:

said brake condition detection means is further for deriving a value of an energy condition of a frequency band in which said fluctuation of resonance vibration is generated and estimating said gradient of said coefficient of friction from a change in said value.

9. A brake condition detection system according to claim 6, wherein:

said brake condition detection means is further for calculating brake force when said gradient of coefficient of friction is less than a predetermined amount and for calculating said coefficient of friction based upon said brake force and a load of said wheel.

10. A brake condition detection system according to claim 1, said brake condition detection system further comprising:

a solenoid valve for producing said resonance vibration by switching a hydraulic circuit which controls a brake condition of said wheel.

11. A brake condition detection system according to claim 10, wherein:

said fluctuation detection means is further for estimating a timing of pulsation of hydraulic pressure appearing in said wheel from a command signal to a source of said resonance vibration to determine a range of measurement of said fluctuation of resonance vibration.

12. A brake condition detector according to claim 10, wherein:

a volume expansion rate of said hydraulic circuit is such that a frequency of said resonance vibration produced after switching said hydraulic circuit coincides with a frequency of tire resonance vibration.

13. A brake condition detector according to claim 12, wherein:

said volume expansion rate of said hydraulic circuit is governed by at least one of a diameter of a pipe of said hydraulic circuit, an orifice in said hydraulic circuit, and a length of said pipe of said hydraulic circuit.

14. A brake condition detection system according to claim 1, said brake condition detection system further comprising:

a pump for producing said resonance vibration by increasing and reducing hydraulic pressure in a wheel cylinder provided to said wheel.

15. A brake condition detection system according to claim 1, wherein said fluctuation detection means includes:

separation means for separating resonance vibration in said tire as a separated resonance vibration from composite resonance vibration which includes resonance vibration of a suspension system, said fluctuation detection means performing detection of fluctuation of vibration in said tire based on said separated resonance vibration.

16. A brake condition detection system according to claim 1, said brake condition detection system further comprising:

first resonance generation means for generating a first resonance vibration corresponding to at least one of a road condition and a suspension system; and second resonance generation means for generating a second resonance vibration corresponding to said tire, wherein said first resonance vibration and said second resonance vibration do not overlap.

17. A vehicle control system comprising:

a brake condition detector which includes fluctuation detection means for detecting fluctuation of resonance vibration in a tire of a wheel of a vehicle based on vibrational energy fluctuating between an inertia of a tire wheel and an inertia of a surface of the tire and brake condition detection means for detecting a brake condition of said wheel based upon said fluctuation of resonance vibration detected by said fluctuation detection means;

adjustment means for adjusting hydraulic pressure in a wheel cylinder coupled to said wheel; and control means for controlling a brake force of said wheel by driving said adjustment means based upon said brake condition detected by said brake condition detector.

18. A vehicle control system according to claim 17, wherein:

said control means is further for executing anti-skid control for said vehicle based upon at least one of a gradient which indicates change of a coefficient of friction of said wheel, wheel speed and wheel acceleration.

19. A vehicle control system comprising:
a brake condition detector which includes fluctuation detection means for detecting fluctuation of resonance vibration in tires of wheels of a vehicle and brake condition detection means for detecting a brake condition of said wheels based upon said fluctuation of resonance vibration detected by said fluctuation detection means;
adjustment means for adjusting hydraulic pressure in a wheel cylinder coupled to said wheel; and
control means for controlling vehicle yawing by driving said adjustment means to control brake forces of left and right wheels based on a difference in hydraulic pressures in left and right wheels.

20. A vehicle control system according to claim 19, wherein:
said control means is further for controlling vehicle yawing based upon at least one of a gradient showing a change of a coefficient of friction of a vehicle wheel, wheel speed and wheel acceleration.

21. A brake condition detector comprising:
vibration detection means for detecting a first vibration energy of a resonance vibration generated in a wheel part side of a wheel of a vehicle and a second vibration energy generated after said resonance vibration reflected by a tire surface of a tire attached to said wheel fluctuates from said wheel via an interior of said tire to said tire surface in contact with a road; and
brake condition detection means for detecting a brake condition based on a relationship between said first vibration energy and said second vibration energy.

22. A brake condition detector according to claim 21, wherein said vibration detection means includes:
first detection means for detecting said first vibration energy; and
second detection means for detecting said second vibration energy.

23. A brake condition detector according to claim 21, wherein:
said brake condition detection means is further for determining a correlation between said first vibration energy and said second vibration energy by extracting a resonant vibration frequency that has a predetermined frequency from among resonant vibrations that appear in the wheel of said vehicle due to introduction of vibration to said vehicle.

24. A brake condition detector according to claim 23, wherein:
said brake condition detection means is further for detecting a frequency of around 100 Hz as said resonant vibration frequency.

25. A brake condition detector comprising:
resonance vibration detection means for detecting tire resonance vibration in a tire of a vehicle and surface resonance vibration reflected by a surface of said tire that is in contact with a road; and
brake condition detection means for detecting a brake condition of a wheel of a vehicle based on energies of said tire resonance vibration and said surface resonance vibration detected by said resonance vibration detection means.

26. A brake condition detector comprising:
fluctuation detection means for detecting sloshing of resonant vibration in a tire of a wheel of a vehicle based on vibrational energy fluctuating between an inertia of a tire wheel and an inertia of a surface of the tire; and
brake condition detection means for detecting a brake condition of said vehicle based on said sloshing.

27. A brake condition detection system for a vehicle comprising:
a fluctuation detection unit constructed and arranged to detect fluctuation of resonance vibration in a tire of a wheel of the vehicle based on vibrational energy fluctuating between tire wheel inertia and tire surface inertia; and
a brake condition detection unit constructed and arranged to detect a brake condition of said wheel based upon said fluctuation of resonance vibration determined by said fluctuation detection unit.

28. The brake condition detection system of claim 27, wherein said fluctuation detection unit is constructed and arranged to detect said fluctuation of resonance vibration based upon a vibration level derived from at least one of a wheel speed sensor, an acceleration sensor, a torque sensor, and a strain gauge coupled to said wheel.

29. The brake condition detection system of claim 27, wherein said brake condition detection unit is constructed and arranged to estimate a gradient of a coefficient of friction which indicates the brake condition of said wheel.

30. The brake condition detection system of claim 29, wherein said brake condition detection unit is constructed and arranged to detect said brake condition based upon change of said gradient of said coefficient of friction.

31. The brake condition detection system of claim 27, wherein said fluctuation detection unit is constructed and arranged to estimate a timing of pulsation of hydraulic pressure applied to said wheel to determine a range of measurement of said fluctuation of resonance vibration, the estimation of the timing of pulsation being based on a command signal sent to a source of said resonance vibration.

32. The brake condition detection system of claim 29, wherein said brake condition detection unit is constructed and arranged to calculate brake force when said gradient of the coefficient of friction is less than a predetermined amount and calculates said coefficient of friction based upon said brake force and a load of said wheel.

33. A vehicle control system comprising:
a fluctuation detection unit constructed and arranged to detect fluctuation of resonance vibration in a tire of a wheel of the vehicle based on vibrational energy fluctuating between tire wheel inertia and tire surface inertia;
a brake condition detection unit constructed and arranged to detect a brake condition of said wheel based upon said fluctuation of resonance vibration determined by said fluctuation detection unit;
a pressure adjuster constructed and arranged to adjust hydraulic pressure in a wheel cylinder coupled to said wheel; and
a controller constructed and arranged to control a brake force of said wheel by driving said pressure adjuster based upon said brake condition determined by said brake condition detection unit.

34. A brake condition detector for a vehicle comprising:
a vibration detection unit constructed and arranged to detect a first vibration energy of a resonance vibration generated in a wheel part side of a wheel of the vehicle and a second vibration energy generated after said resonance vibration reflected by a tire surface of a tire attached to said wheel fluctuates from said wheel via an interior of said tire to said tire surface in contact with a road; and a brake condition detection unit constructed and arranged to detect a brake condition based on a relationship between said first vibration energy and said second vibration energy.

35. A brake condition detector for a vehicle comprising:
a resonance vibration detection unit constructed and arranged to detect tire resonance vibration in a tire of the vehicle and surface resonance vibration reflected by a surface of said tire that is in contact with a road; and
a brake condition detection unit constructed and arranged to detect a brake condition of a wheel of the vehicle based on energies of said tire resonance vibration and said surface resonance vibration detected by said resonance vibration detection unit.

36. A method for detecting a braking condition of a vehicle comprising:
detecting a fluctuation of resonance vibration in a tire of a wheel of the vehicle based on vibrational energy fluctuation between tire wheel inertia and tire surface inertia; and
determining a brake condition of the wheel based upon the fluctuation of the detected resonance vibration.

37. The method of claim 36, wherein the fluctuation resonance vibration is based upon a vibration level sensed by at least one of a wheel speed sensor, an acceleration sensor, a torque sensor, and a strain gauge coupled to the wheel.

38. A method for controlling a vehicle comprising:
detecting fluctuation of resonance vibration in a tire of a wheel of the vehicle based on vibrational energy fluctuation between tire wheel inertia and tire surface inertia;
determining a brake condition of the wheel based on the detected fluctuation of resonance vibration; and
controlling pressure to a wheel cylinder coupled to the wheel to control brake force applied to the wheel in response to the determined brake condition.

* * * * *